United States Patent [19]

Kiya

[11] Patent Number: 4,783,617
[45] Date of Patent: Nov. 8, 1988

[54] METHOD OF RESTORING A ROTARY AXIS TO A REFERENCE POINT

[75] Inventor: Nobuyuki Kiya, Tokyo, Japan
[73] Assignee: Fanuc Ltd, Yamanashi, Japan
[21] Appl. No.: 881,023
[22] PCT Filed: Oct. 18, 1985
[86] PCT No.: PCT/JP85/00586
 § 371 Date: Jun. 16, 1986
 § 102(e) Date: Jun. 16, 1986
[87] PCT Pub. No.: WO86/02470
 PCT Pub. Date: Apr. 24, 1986

[30] Foreign Application Priority Data

Oct. 20, 1984 [JP] Japan .............................. 220844/1984

[51] Int. Cl.$^4$ .............................................. G05B 19/10
[52] U.S. Cl. ..................................... 318/567; 318/569; 364/474.34
[58] Field of Search ............... 318/567, 569, 664, 561, 318/560, 565; 364/474, 475, 167

[56] References Cited

U.S. PATENT DOCUMENTS

| | | | |
|---|---|---|---|
| 4,410,951 | 10/1983 | Nakamura et al. | 318/567 X |
| 4,556,833 | 12/1985 | Kishi et al. | 318/567 |
| 4,604,560 | 8/1986 | Inagaki et al. | 318/567 |

Primary Examiner—William M. Shoop, Jr.
Assistant Examiner—D. Martin
Attorney, Agent, or Firm—Staas & Halsey

[57] ABSTRACT

The present invention relates to a method of restoring a rotary axis to a reference point. A workpiece coordinate system serving as a programming reference with respect to a machine coordinate system is decided, numerical control (NC) program data are created including at least NC data specifying an angle r between an origin (WR) of the workpiece coordinate system and a reference point (MR) in the machine coordinate system, and rotational direction positioning data based on the workpiece coordinate system, and a rotary axis is positionally controlled based on the NC program data. The method includes updating present positions Pm, Pw of a fixed point Q on a rotary axis (11) in the machine coordinate system and workpiece coordinate system in dependence upon rotation of the rotary axis, obtaining an angle a that satisfies the equations $$Pm = 360 \cdot n + a, \quad Pw = 360 \cdot n + a - r$$

in response to a reference point restoration command, then rotating the rotary axis by $|a|°$ to restore the fixed point Q to the reference point (MR) in the machine coordinate system, thereafter updating the present positions Pm, Pw in the machine and workpiece coordinate systems, respectively, in accordance with the expressions Pm − 360·n → Pm
Pw − 360·n → Pw whereby the rotary axis (11) is restored to the reference point (MR) within one revolution and the machine and workpiece coordinate systems are returned to their original attitudes (Pm=0, Pw=−r).

7 Claims, 2 Drawing Sheets

METHOD OF RESTORING A ROTARY AXIS TO A REFERENCE POINT

BACKGROUND OF THE INVENTION

TECHNICAL FIELD

This invention relates to a method of restoring a rotary axis to a reference point. More particularly, the invention relates to a rotary axis reference point restoration method for rotating the rotary table of a machine to position the table at a predetermined angular position.

BACKGROUND ART

In a machine tool having a rotary table, a rotary axis is rotated to position the table at a predetermined angular position by numerical control (NC) in the same manner that control is performed along linear axes (e.g. X, Y and Z axes) so that a workpiece placed upon the table may be subjected to boring and other machining. In numerical control, (1) a rotational direction workpiece coordinate system serving as a programming reference for a rotational direction machine coordinate system is decided, (2) data specifying an angle r between the origin of the workpiece coordinate system and a reference point in the machine coordinate system are commanded by a program (a G-function instruction for setting a coordinate system), and (3) the position of the rotary axis is controlled by NC program data created on the basis of the workpiece coordinate system, and present positions Pm, Pw in the machine and workpiece coordinate systems, respectively, are monitored. Note that Pm=0, Pw=−r will hold when the rotary axis is situated at the reference point.

When the rotary axis is to be restored to the reference point in the machine coordinate system, it is desired to perform the reference point restoration by rotation through less than one revolution in order to shorten restoration time. Conventionally, therefore, whenever the present position Pm in the machine coordinate system surpasses 360°, the present position Pm is reset to 0 so that the value of Pm is kept below 360° at all times. As a result, when a reference point restoration command is generated, the rotary axis is rotated only by Pm degrees to be restored to the reference point, so that the amount of rotation required for the reference point restoration operation is less than one revolution.

However, when a reference point restoration is performed in a case where the present position Pw in the workpiece coordinate system is more than one revolution away from the origin of the workpiece coordinate system, the present position Pm in the machine coordinate system becomes 0° in correct fashion, but the value of the present point Pw in the workpiece coordinate system does not become −r. Accordingly, the workpiece coordinate system does not return to its original attitude, thus making it necessary to reset the coordinate system after the reference point restoration. The reason why Pw does not become −r is that only Pm is reset to 0 when it exceeds 360°, whereas Pw is not reset to 0 when it exceeds 360°. The reason why Pw cannot be reset to 0 is that since a target position is commanded in excess of 360° by the NC data, correct positioning would no longer be possible if Pw were reset to 0.

SUMMARY OF THE INVENTION

Accordingly, an object of the invention is to provide a rotary axis reference point restoration method whereby a rotary axis can be restored to a reference point by rotation through less than one revolution, and in which the workpiece and machine coordinate systems can both be returned to their original attitudes (i.e. in which the relations Pm=0, Pw=−r can be established) after the reference point restoration.

A workpiece coordinate system serving as a programming reference with respect to a machine coordinate system is decided, NC program data are created including at least NC data specifying an angle r between an origin of the workpiece coordinate system and a reference point in the machine coordinate system, and rotational direction positioning data based on the workpiece coordinate system, and a rotary axis is positionally controlled based on the NC program data.

The method of the invention includes updating present positions Pm, Pw of a fixed point Q on the rotary axis in the machine coordinate system and workpiece coordinate system in dependence upon rotation of the rotary axis, obtaining an angle a that satisfies the equations $$Pm=360.n+a, Pw=360.n+a-r$$

in response to a reference point restoration command, then rotating the rotary axis by $|a|°$ to restore the fixed point Q to the reference point in the machine coordinate system, thereafter updating the present positions Pm, Pw in the machine and workpiece coordinate systems, respectively, in accordance with the expressions $$Pm-360.n \rightarrow Pm$$

$$Pw-360.n \rightarrow Pw$$

whereby the rotary axis is restored to the reference point within one revolution and the machine and workpiece coordinate systems are returned to their original attitudes (Pm=0, Pw=−r).

DESCRIPTION OF THE PREFERRED EMBODIMENTS

FIG. 1 is a view for describing the general features of the present invention. MR represents a rotating direction reference point (hereafter referred to simply as a "reference point") in a machine coordinate system, and WR denotes a rotating direction origin of a workpiece coordinate system. The angle between the reference point MR and the origin WR of the workpiece coordinate system is r. Let the clockwise direction and counter-clockwise directions be positive and negative, respectively, and let the present positions of a fixed point Q on a rotary axis 11 in the machine coordinate system and workpiece coordinate system be Pm, Pw (neither of which is reset to 0 even if 360° is exceeded), respectively.

Figure 1A:
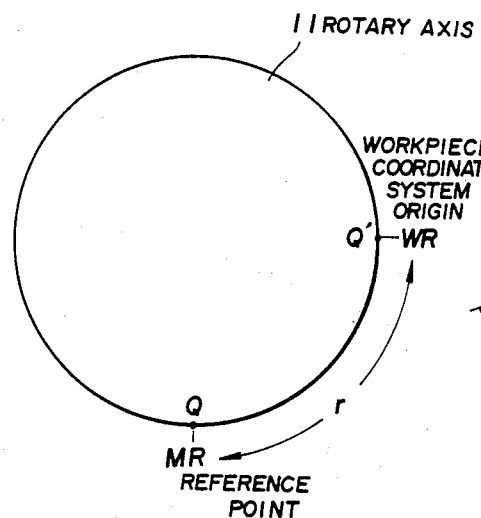
FIG. 1A is a view of the rotary axis restored.
Figure 1B:
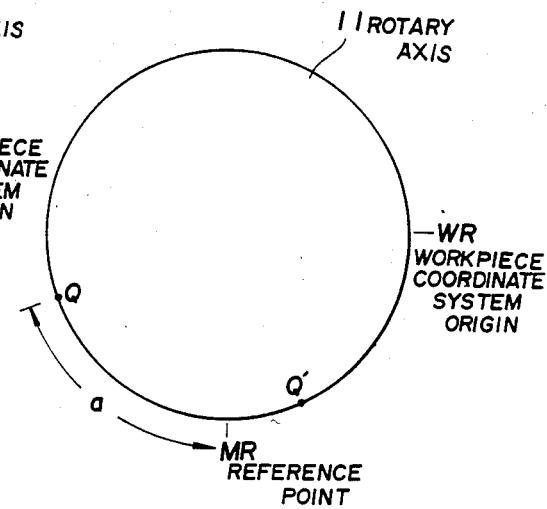
FIG. 1B is a view of the rotary axis rotated.

Of fixed points Q, Q' on the rotary axis 11, the fixed point Q is situated at the reference point MR and the fixed point Q' is situated at the origin WR of the workpiece coordinate system when the rotary axis has been restored to the reference point, as shown in FIG. 1(A). If the rotary axis 11 is rotated by $(360n+a)°$ from this state, the positional relationship among the fixed points Q, Q', reference point MR and the origin WR of the workpiece coordinate system will be as illustrated in FIG. 1(B). The present position Pm in the machine coordinate system becomes $$Pm = 360 \cdot n + a \qquad (1)$$

and the position Pw in the workpiece coordinate system becomes $$Pw = 360 \cdot n + a - r \qquad (2)$$

The following steps are executed in accordance with the invention:

(a) If a reference point restoration command is generated with the rotary axis in the state shown in FIG. 1(B), the angle a that satisfies Eq. (1) is obtained.

(b) The rotary axis 11 is rotated by $|a|°$ in a direction conforming to the sign of angle a in order to be restored to the reference point MR in the machine coordinate system. Note that if $a > 0$ holds, the reference point restoration is performed by rotating the rotary axis 11 $a°$ in the counter-clockwise direction; if $a < 0$ holds, the reference point restoration is performed by rotating the rotary axis 11 $|a|°$ in the clockwise direction. Pm, Pw become as follows by rotating the axis $|a|°$:

$$Pm = 360 \cdot n \qquad (3)$$

$$Pw = 360 \cdot n - r \qquad (4)$$

(c) Finally, the values of Pm, Pw are updated in accordance with the expressions $$Pm - 360 \cdot n \rightarrow Pm \qquad (5)$$

$$Pw - 360 \cdot n \rightarrow Pw \qquad (6)$$

whereupon Pm becomes 0 and Pw becomes $-r$. The machine and workpiece coordinate systems thus are restored to their original attitudes. It should be noted that operations $$0 \rightarrow Pm, \quad -r \rightarrow Pm$$

cannot be performed directly without relying upon the calculations indicated by expressions (5), (6). The reason is that the value of r is not stored in the NC unit. It is possible to establish the relations $Pm = 0$, $Pw = -r$ by performing the operations $$Pw - Pm \rightarrow Pw \qquad (5)'$$

$$0 \rightarrow Pm \qquad (6)'$$

rather than the operations indicated by the expressions (5), (6).

The foregoing relates to a case where the reference point restoration is executed within one revolution (360°) of rotation. However, it is also possible to effect the reference point restoration within ½ revolution (180°) of rotation and to return the machine and workpiece coordinate systems to their original states. This is accomplished as follows:

(1) If a reference point restoration command is generated with the rotary axis in the state shown in FIG. 1(B), the angle a that satisfies Eqs. (1), (2) is obtained.

(2) Next, $|a|$ and 180 are compared in terms of magnitude. If $|a| \leq 180$ holds, the rotary axis is rotated by $|a|°$ to be restored to the reference point MR in the machine coordinate system. Note that the rotary axis is restored to the reference point by being rotated counter-clockwise if $a > 0$ holds and clockwise if $a < 0$ holds. The values of Pm, Pw are updated to the values indicated by Eqs. (3), (4) by $|a|°$ of rotation.

If $|a| > 180$ holds, the rotary axis is rotated by $(360 - |a|)°$ to be restored to the reference point in the machine coordinate system. Note that the rotary axis is restored to the reference point by being rotated clockwise if $a > 0$ holds and counter-clockwise if $a < 0$ holds. The values of Pm, Pw are updated as follows by $(360 - |a|)°$ of rotation $$Pm = 360 \cdot (n \pm 1) \qquad (7)$$

$$Pw = 360 \cdot (n \pm 1) - r \qquad (8)$$

In Eqs, (7), (8), the signs in the parentheses become $+$ when a is positive and $-$ when a is negative.

(3) Thereafter, the present positions Pm, Pw in the machine and workpiece coordinate systems, respectively, are updated in accordance with expressions (5), (6) if $|a| < 180$ holds, and in accordance with the expressions $$Pm - 360 \cdot (n \pm 1) \rightarrow Pm \qquad (9)$$

$$Pw - 360 \cdot (n \pm 1) \rightarrow Pw \qquad (10)$$

if $|a| > 180$ holds. Note that it is also possible to establish the relations $Pm = 0$, $Pw = -r$ in accordance with the following expressions rather than using expressions (9), (10):

$$Pw - Pm \rightarrow Pw \qquad (9)'$$

$$0 \rightarrow Pm \qquad (10)'$$

The foregoing enables the reference point restoration to be completed within 180° of rotation and also permits $Pm = 0$, $Pw = -r$ to be achieved to return both the machine coordinate system and workpiece coordinate system to their original attitudes.

Figure 2:
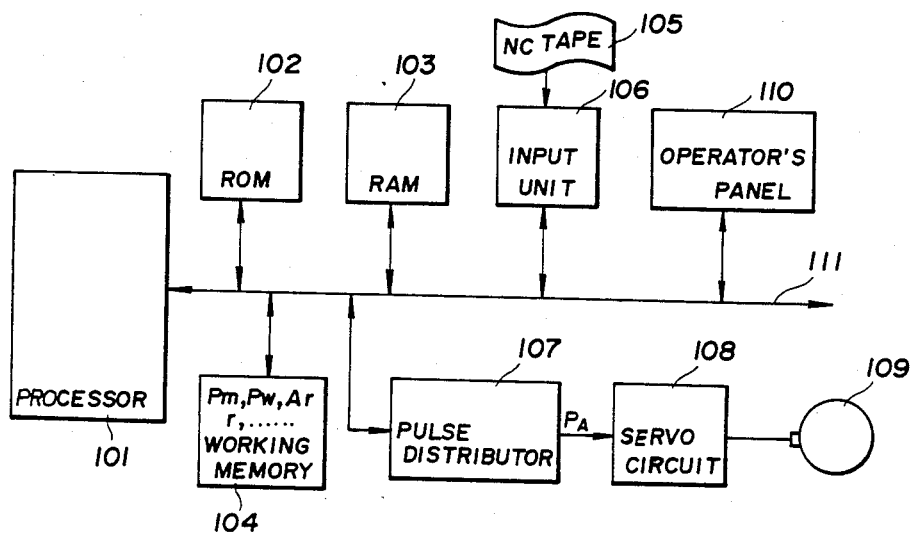
FIG. 2 is a block diagram of an NC unit to which the present invention can be applied.
Figure 3:
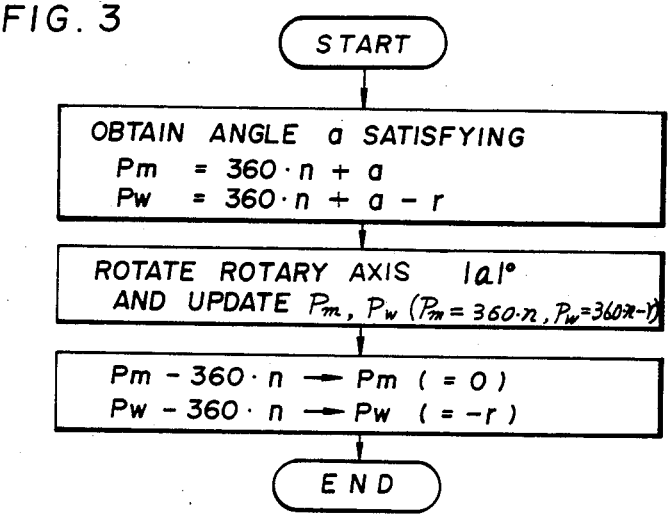
FIG. 3 is a flowchart of processing according to the present invention for a case where a reference point restoration is made by rotation through less than 360°.

FIG. 2 is a block diagram of a numerical control unit to which the present invention can be applied, and FIG. 3 is a flowchart of processing according to the invention.

In FIG. 2, numeral 101 denotes a processor, 102 a ROM storing a control program, 103 a RAM, 104 a working memory, 105 an NC tape, 106 an input unit for reading NC program data from the NC tape 105 and for inputting the data, 107 a pulse distributor, 108 a servo circuit, 109 a motor for driving the rotary axis, 110 an operator's panel, and 111 a bus line.

The NC data are read from the NC tape 105 and stored in the RAM 103. If the system is now started by pressing a start button on the operator's panel 110, the processor 101 reads NC data out of the RAM 103 one block at a time and executes predetermined numerical control processing.

By way of example, if a G-function instruction for setting a coordinate system is read, the processor 101 stores an angle specified by the instruction in the working memory 104 as the present position Pw in the workpiece coordinate system. If a positioning command is issued, positioning processing, described below, is executed. Note that the description will deal with a case where the rotary axis is subjected to simultaneous one-axis control.

In response to the positioning command, the processor obtains a rotary axis incremental value Ri and performs an operation in accordance with the expression $$F \cdot \Delta T \rightarrow \Delta A \qquad (11)$$

(where F is the rotational velocity and $\Delta T$ is a predetermined period of time) to calculate an amount of movement $\Delta A$ to be traversed in the time $\Delta T$.

Next, $\Delta A$ is applied to the pulse distributor 107 at intervals of $\Delta T$, and the pulse distributor 107 generates distributed pulses $P_A$ applied to the servo circuit 108, thereby rotating the motor 109 to rotate the rotary axis 11 shown in FIG. 1.

Further, the processor updates the present position and a remaining amount of rotation Ar at intervals of $\Delta T$. Specifically, the present position Pm in the machine coordinate system and the present position Pw in the workpiece coordinate system, both of which are stored in the working memory 104, are updated every $\Delta T$ in accordance with the expressions $$Pm \pm \Delta A \rightarrow Pm \qquad (12)$$

$$Pw \pm \Delta A \rightarrow Pw \qquad (13)$$

Similarly, the remaining amount of rotation AR, which has been stored in the working memory 104, is updated in accordance with the expression $$Ar - \Delta A \rightarrow Ar \qquad (14)$$

In expressions (12), (13), +signifies clockwise rotation and −signifies counter-clockwise rotation. In addition, if reference point restoration has been accomplished, Pm=0, Pw=−r will hold. Furthermore, the initial value of Ar in expression (14) is the incremental value Ai.

The processor 101 thereafter checks whether Ar=0 holds. If Ar=0, positioning processing is ended; if Ar≠0, the processor checks whether Ar≧$\Delta A$ holds.

If Ar≧$\Delta A$ is found to hold, the above-described processing is repeated every $\Delta T$. If the operation Ar→$\Delta A$ is performed and the foregoing processing is executed when the relation Ar<$\Delta A$ comes to hold, then the relation Ar=0 will be established and positioning processing is ended.

If an origin restoration command is generated by the operator's panel 110 when the rotary axis 11 has been rotated and stopped at the position shown in FIG. 1(B) by the foregoing processing, the processor 101 subsequently executes origin restoration processing in accordance with the flowchart shown in FIG. 3. It should be noted that the reference point restoration is assumed to be performed within 360° of rotation.

(a) The processor 101 obtains the angle a that satisfies Eqs. (1), (2). It should be noted that if a quotient n and a remainder a are obtained by dividing the present position Pm in the machine coordinate system by 360°, the remainder a will be the a that satisfies Eqs. (1), (2).

(b) Next, the processor 101 executes processing similar to that for the above-described positioning control, whereby the rotary axis 11 is rotated by $|a|°$ in a direction conforming to the sign of angle a to restore the rotary axis to the reference point of the machine coordinate system. Note that the reference point restoration is performed by rotating the rotary axis 11 a° in the counter-clockwise direction if a>0 holds and $|a|°$ in the clockwise direction if a<0 holds. Pm, Pw take on the following values owing to a° of rotation:

$$Pm = 360 \cdot n$$

$$Pw = 360 \cdot n - r$$

(c) Thereafter, when the processor 101 updates Pm, Pw in accordance with expressions (5), (6), Pm becomes 0 and Pw becomes −r, so that the mechanical and workpiece coordinate systems are returned to their original states.

Figure 4:
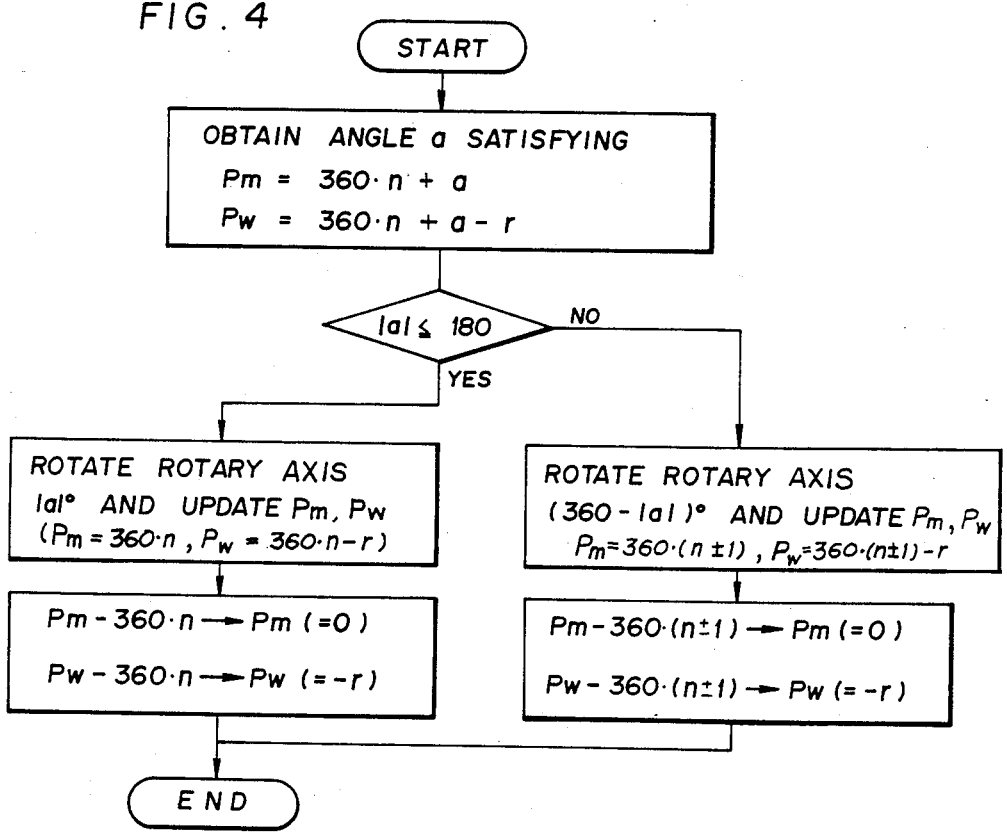
FIG. 4 is a flowchart of processing according to the present invention for a case where a reference point restoration is made by rotation through less than 180°.

In order to perform the reference point restoration by an amount of rotation within 180°, processing is executed in accordance with the flowchart shown in FIG. 4. Specifically, the following steps are executed if a reference point restoration command is generated when the rotary axis is in the state shown in FIG. 1(B):

(a) The angle a that satisfies Eqs. (1), (2) is obtained through a method similar to that described above.

(b) Next, $|a|$ and 180 are compared in terms of magnitude. If $|a|≦180$ holds, processing similar to that for the above-described positioning control is executed and the rotary axis is rotated by $|a|°$ to be restored to the reference point MR in the machine coordinate system. Note that the rotary axis is restored to the reference point by being rotated counter-clockwise if a>0 holds and clockwise if a<0 holds. The values of Pm, Pw are updated to the values indicated by Eqs. (3), (4) by $|a|°$ of rotation.

If $|a|>180$ holds, the rotary axis is rotated by $(360−|a|)°$ to be restored to the reference point in the machine coordinate system. Note that the rotary axis is restored to the reference point by being rotated clockwise if a > 0 holds and counter-clockwise if a < 0 holds. The values of Pm, Pw are updated to the values indicated by the Eqs. (7), (8) by $(360−|a|)°$ of rotation.

(c) Thereafter, the present positions Pm, Pw in the machine and workpiece coordinate systems, respectively, are updated in accordance with expressions (5), (6) if $|a|≦180$ holds, and in accordance with the expressions (9), (10) if $|a|>180$ holds.

The foregoing enables the reference point restoration to be completed within 180° of rotation and also permits Pm=0, Pw=−r to be achieved to return both the machine coordinate system and workpiece coordinate system to their original attitudes.

Thus, in accordance with the present invention as described above, the arrangement is such that a reference point restoration is executed by a first step of updating the present positions Pm, Pw in the machine and workpiece coordinate systems, respectively, in dependence upon rotation of the rotary axis and, in response to a reference point restortion command, obtaining the angle a that satisfies the equations $$Pm = 360 \cdot n + a, \quad Pw = 360 \cdot n + a - r$$

a second step of rotating the rotary axis by a° to return the rotary axis to the reference point in the machine coordinate system, and a third step of updating the present positions Pm, Pw in the machine and workpiece coordinate systems, respectively, in accordance with, e.g. the following expressions:

Pm−360.n→Pm

Pw−360.n→Pw

As a result, the reference point restoration can be performed by rotation through less than 360°, namely in a short period of time, and the workpiece coordinate system can be returned to its original state after the reference point restoration. This dispenses with the need to set the workpiece coordinate system after the restoration is completed, as is necessary in the prior art.

Further, according to the present invention, the arrangement is such that a reference point restoration is executed by a first step of updating the present positions Pm, Pw in the machine and workpiece coordinate systems, respectively, in dependence upon rotation of the rotary axis and, in response to a reference point restortion command, obtaining the angle a that satisfies the equations $Pm = 360 \cdot n + a, \ Pw = 360 \ n + a - r$ a second step of comparing $|a|$ and 180 in terms of magnitude and restoring the rotayy axis to the reference point by rotating it $|a|°$ in a case where $|a| \leq 180$ holds, a third step of restoring the rotary axis to the reference point by rotating it $(360 - |a|)°$ in a case where $|a| > 180$ holds, a fourth step of updating the present positions Pm, Pw in the machine and workpiece coordinate systems, respectively, in accordance with, e.g. the following expressions:

Pm−360.n→Pm

Pw−360.n→Pw in a case where $|a| \leq 180$ holds and updating the present positions Pm, Pw in the machine and workpiece coordinate systems, respectively, in accordance with, e g. the following expressions:

Pm−(360.n±1)→Pm

Pw−(360.n±1)→Pw (where the signs in the parentheses are made + when a is positive and − when a is negative) in a case where $|a| > 180$ holds. Accordingly, a reference point restoration can be executed within 180° of rotation to achieve a further reduction in the time needed for the reference point restoration.

I claim:

1. A method of restoring a rotary axis to a reference point in which a rotational direction workpiece coordinate system serving as a programming reference with respect to a rotational direction machine coordinate system is decided, data specifying an angle r between an origin of the workpiece coordinate system and a reference point in the machine coordinate system are commanded by a program, a rotary axis is positionally controlled by numerical control program data created based on the workpiece coordinate system, and the rotary axis is restored to the reference point in the machine coordinate system by a reference point restoration command, said method comprising the steps of:
   updating present positions Pm, Pw in the machine and workpiece coordinate systems, respectively, in dependence upon rotation of said rotary axis and, in response to the reference point restoration command, obtaining an angle a that satisfies the equations $Pm = 360 \cdot n + a, \ Pw = 360 \cdot n + a - r$ where n represents a quotient and a represents a remainder of a°, the angle a resulting from dividing the present position Pm by 360°;
   (b) rotating the axis by a° to return the rotary axis to the reference point in the machine coordinate system; and
   (c) updating the present positions Pm, Pw in the machine and workpiece coordinate systems, respectively, in such a manner that relations Pm=0, Pw=−r are established.

2. A method of restoring a rotary axis to a reference point according to claim 1, wherein said updating step (c) further comprises performing calculations defined by expressions Pm−360.n→P Pw−360.n→Pw to establish the relations Pm=0, Pw=−R.

3. A method of restoring a rotary axis 60 a reference point according to claim 1, wherein said updating step (c) further comprises performing calculations defined by expressions Pw−Pm→Pw 0→Pm to establish the relations Pm=0, Pw=−r.

4. A method of restoring a rotary axis to a reference point according to claim 1, wherein the rotary axis is restored to the reference point by being rotated in a predetermined direction in a case where a is positive and in a direction opposite to said predetermined direction in a case where a is negative.

5. A method of restoring a rotary axis to a reference point in which a rotational direction workpiece coordinate system serving as a programming reference with respect to a rotational direction machine coordinate system is decided, data specifying an angle r between an origin of the workpiece coordinate system and a reference point in the machine coordinate system are commanded by a program, a rotary axis is positionally controlled by numerical control program data created based on the workpiece coordinate system, and the rotary axis is restored to the reference point in the machine coordinate system by a reference point restoration command, said method comprising the steps of:
   (a) updating present positions Pm, Pw in the machine and workpiece coordinate systems, respectively, in dependence upon rotation of said rotary axis and, in response to the reference pont restoration command, obtaining an angle a that satisfies the equations $Pm = 360 \cdot n + a, \ Pw = 360.n + a - r$ where n represents a quotient and a represents a remainder of a°, angle a, resulting from dividing the present position Pm by 360;

(b) comparing $|a|$ and 180 in terms of magnitude and restoring the rotary axis to the reference point by rotating the rotary axis $|a|°$ in a case where $|a| \leq 180$ holds;

(c) restoring the rotary axis to the reference point by rotating the rotary axis $(360-|a|)°$ in a case where $|a| > 180$ holds; and (d) establishing the relations Pm=0, Pw=−r for the present positions Pm, Pw in the machine and workpiece coordinate systems, respectively.

6. A method of restoring a rotary axis to a reference point according to claim 5, wherein said establishing step (d) further comprises performing calculations defined by expressions $$Pm - 360.n \rightarrow Pm$$

$$Pw - 360.n \rightarrow Pw$$

in a case where $|a| \leq 180$ holds and performing calculations defined by expressions $$Pm - 360.(n \pm 1) \rightarrow Pm$$

$$Pw - 360.(n \pm 1) \rightarrow Pw$$

where the signs in the parentheses are made + when a is positive and − when a is negative, in a case where $|a| > 180$ holds.

7. A method of restoring a rotary axis to a reference point according to claim 5, wherein said establishing step (d) further comprises performing calculations defined by expressions $$Pw - Pm \rightarrow Pw$$

$$0 \rightarrow Pm$$

to establish the relations Pm=0, Pw=−r.

* * * * *

UNITED STATES PATENT AND TRADEMARK OFFICE
CERTIFICATE OF CORRECTION

PATENT NO. : 4,783,617

DATED : November 8, 1988

INVENTOR(S) : Nobuyuki Kiya

It is certified that error appears in the above-identified patent and that said Letters Patent is hereby corrected as shown below:

Col. 7, line 67, before "updating" insert --(a)--.

Col. 8, line 30, "60" should be --to--.

Signed and Sealed this

Twenty-first Day of February, 1989

Attest:

DONALD J. QUIGG

*Attesting Officer*   *Commissioner of Patents and Trademarks*